No. 807,034.  PATENTED DEC. 12, 1905.
F. VON KÜGELGEN & G. O. SEWARD.
PROCESS OF DECARBURIZING.
APPLICATION FILED JAN. 16, 1904.
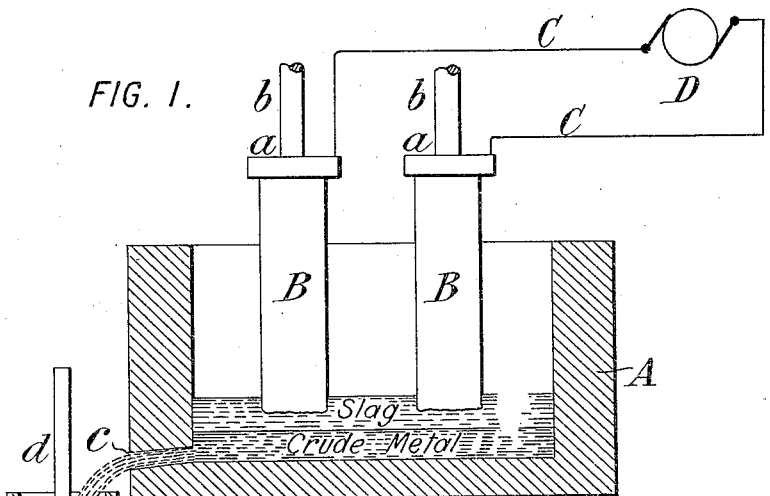
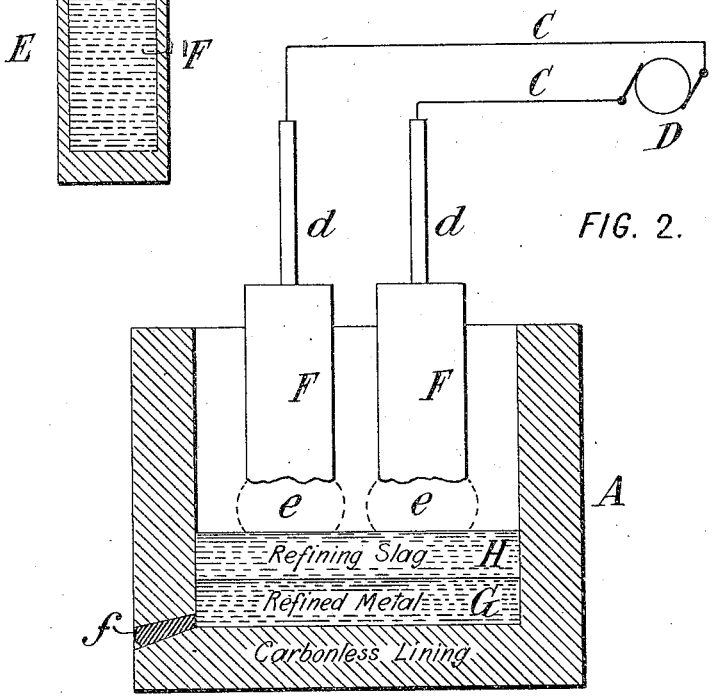

UNITED STATES PATENT OFFICE.

FRANZ VON KÜGELGEN AND GEORGE O. SEWARD, OF HOLCOMBS ROCK, VIRGINIA, ASSIGNORS TO THE WILLSON ALUMINUM COMPANY, OF NEW YORK, N. Y., A CORPORATION OF NEW YORK.

PROCESS OF DECARBURIZING.

No. 807,034.      Specification of Letters Patent.      Patented Dec. 12, 1905.

Application filed January 16, 1904. Serial No. 189,273.

*To all whom it may concern:*

Be it known that we, FRANZ VON KÜGELGEN, a subject of the German Emperor, and GEORGE O. SEWARD, a citizen of the United States, both residing at Holcombs Rock, in the county of Bedford and State of Virginia, have jointly invented certain new and useful Improvements in Processes of Decarburizing, of which the following is a specification.

This invention provides a process for producing commercially carbon-free metals or alloys, applicable also to metalloids such as are reducible by electric smelting.

If metals or analogous substances high in carbon are refined in the electric furnace with carbon pencils, using a slag or lining of lime or oxids, it is possible to decarburize to only a very limited extent, because the refined metal is recarburized by taking carbon from the pencils or electrodes. Various experiments have shown the impossibility of obtaining metals having a strong carbon affinity—such as chromium, for example—with less than one per cent. of carbon by refining in this manner. It is very desirable to be able to produce certain metals or alloys—such as ferrochrome, ferrotungsten, or the like—that are substantially free from carbon or in which the carbon content is reduced to below one per cent. The present invention provides a means for successfully accomplishing this result at a cost materially below the increased commercial value imparted to such metals by the diminution of their carbon content.

In practicing this invention the metal or alloy is first produced by any suitable smelting or reducing process—for example, by electric reduction—whereby a product high in carbon is obtained. The high-carbon metal is then suitably shaped by casting or otherwise to serve as a pencil or electrode in an electric refining-furnace. Then by employing one or two such pencils in an electric refining-furnace the high-carbon product is gradually fused therein by the electrically-generated heat, ordinarily in the electric arc, and the carbon remaining in the product is eliminated by the decarburizing action of the slag or lining. As no carbon is introduced in the furnace, there is no recarburizing effect, and the metal remains in a refined state. In case one such remelting or refining action is not sufficient to bring the metal low enough in carbon the metal from the refining-furnace is again formed into a pencil or pencils and the refining or decarburizing action is repeated. This may be done two or more times or sufficiently to bring the contained carbon down to the desired low limit.

In the refining-furnace no carbon or carbonaceous material should be present except that which exists in the metal or alloy under treatment.

The decarburizing process is applicable to any metal, alloy, or metalliferous substance or electroconductive material having sufficient electroconductivity to enable it to be used as an electrode in an electric furnace.

To make the application of this invention more clear, reference is made to the accompanying drawings, wherein—

Figure 1 is a vertical section of an electric furnace wherein the reduction may be effected, and Fig. 2 is a vertical section of a suitable electric furnace in which the decarburizing may be effected.

In the drawings, A designates the furnace walls or lining, which in Fig. 1 may be of any suitable material and in Fig. 2 is a lining free from carbon. In both figures C C are the electric circuits or conductors, and D the dynamo or generator.

In Fig. 1, B B are the electrodes or pencils, which may be of carbon and which are held in suitable heads or holders *a a*, carried on rods *b b*, by which the electrodes are manipulated. When the metal has been produced by reduction in the furnace, Fig. 1, it may be tapped out through a tap-hole *c* to a mold E to form an ingot F, which is preferably cast upon a rod *d*, of iron. Two such ingots F F may constitute the electrodes of the decarburizing-furnace Fig. 2, the iron rods *d d* serving to manipulate them.

In Fig. 2, G is a layer of the refined metal from a previous refining run, and H is a layer of slag. By lowering the ingots or electrodes F F into contact with the metal G a circuit is established, and by raising these electrodes arcs *e e* are formed, the heat of which melts down the electrodes or ingots, the carbon remaining in the fused metal being eliminated by the decarburizing action of the slag H or of the carbon-free lining A, or of both. The refined metal G may be tapped off from time to time at a tap-hole *f*.

Any suitable decarburizing slag or lining may be used. A suitable slag for the refining of ferrochrome is a mixture of lime and chrome ore with suitable fluxes. For refining other metals a similar slag may be used, except that the oxid of the metal to be refined should be substituted for the chrome ore.

What we claim is—

1. Decarburizing a metalliferous substance by fusing it as an electrode in presence of a substance having a high affinity for carbon.

2. Decarburizing a metalliferous substance by electrically fusing it as an electrode in absence of carbonaceous material and in presence of a substance having a high affinity for carbon.

3. Producing a metal or alloy low in carbon by first reducing it in presence of carbonaceous material to produce a metal or alloy high in carbon, and then decarburizing the same by fusing it as an electrode in absence of carbonaceous material and in presence of a substance having a high affinity for carbon.

4. Producing low-carbon ferrochrome by first reducing the ore in presence of carbonaceous material to produce a product high in carbon, and then decarburizing the same by fusing it as an electrode in absence of carbonaceous material and in presence of a substance having a high affinity for carbon.

In witness whereof we have hereunto signed our names in the presence of two subscribing witnesses.

FRANZ VON KÜGELGEN.
GEORGE O. SEWARD.

Witnesses:
GEO. T. LANCASTER,
JNO. B. HUFFARD.